May 22, 1951 — N. R. SCHWARTZ — 2,554,126
WIRE STRIPPING MACHINE
Filed Feb. 21, 1947 — 2 Sheets-Sheet 1

INVENTOR.
NATHAN RODNEY SCHWARTZ.
BY
ATTORNEY.

May 22, 1951      N. R. SCHWARTZ      2,554,126
WIRE STRIPPING MACHINE
Filed Feb. 21, 1947      2 Sheets-Sheet 2
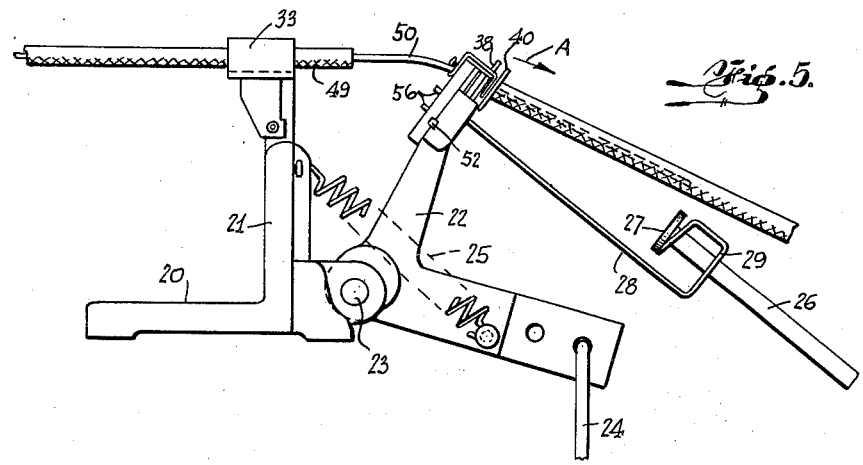
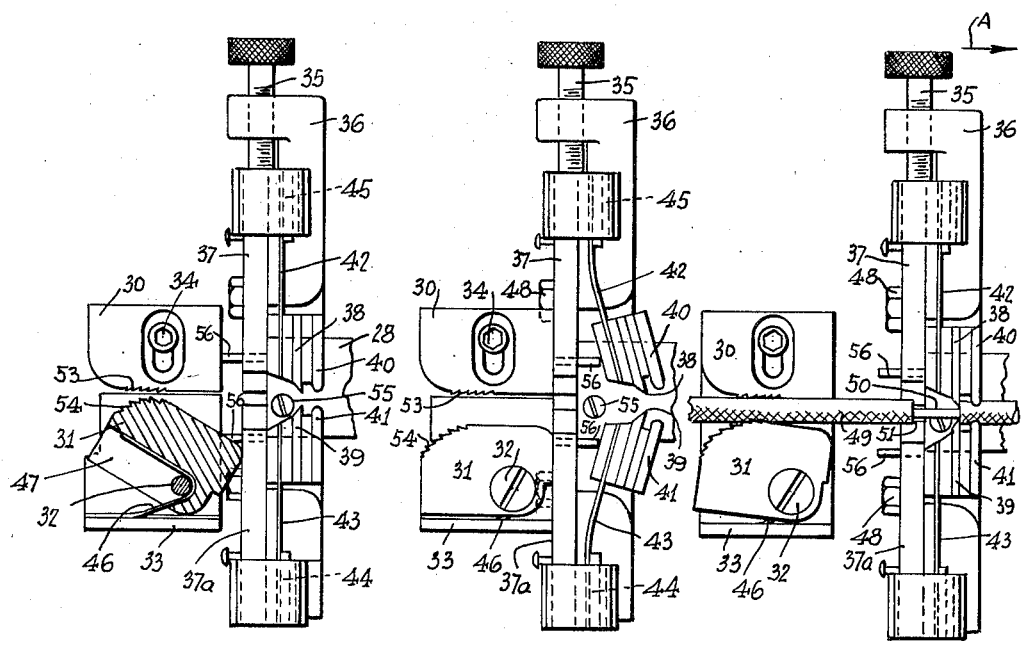
INVENTOR.
NATHAN RODNEY SCHWARTZ.
ATTORNEY.

Patented May 22, 1951

2,554,126

UNITED STATES PATENT OFFICE 2,554,126

WIRE STRIPPING MACHINE

Nathan Rodney Schwartz, Brooklyn, N. Y., assignor to Saran Research Corporation, a corporation of New York Application February 21, 1947, Serial No. 729,903

3 Claims. (Cl. 81—9.51)

This invention relates broadly to wire stripping machines such as are needed to remove to any predetermined extent the insulating or protective cover in which electrical wire is commonly sheathed, and this application is a continuation in part of an application by the present inventor, filed under Serial No. 597,641, which has since been patented under Number 2,475,056 on July 5, 1949.

It is the principal object of the present invention to provide a machine for stripping protective or insulating covering from electrical wire, the machine being provided with a pair of spaced-apart blades, and a pair of gripping elements in alinement with the blades, between which and the blades that portion of the wire which is to be stripped, is adapted to be entered.

It is a further object of the present invention to provide a wire stripping machine of this character, in which the gripping elements are normally in an open or inoperative position, but which is provided with means to change its position to enable it to grip the wire and hold it rigid when the wire is about to be stripped.

And it is yet another advantage of the present invention to provide a wire stripping machine in which the blades are bent slightly rearwardly when the device is in an inoperative position, to provide a passageway as wide as the passageway between the gripping elements, so that wire to be stripped may be inserted between the gripping elements and the blades, the blades assuming cutting position when the gripping elements assume gripping position.

Yet another advantage of the present invention resides in the provision of a guide element extending from the base of the blades to guide the wire and indicate the length of wire to be stripped, the position of the guide element being such, that the wire cannot slip below the level of the blades.

And a still further aim of the present invention resides in the provision of a wire stripping machine the space between the blades of which may be adjusted to provide for the stripping of wire of varying thicknesses.

These and other meritorious objects and advantages, which will become more fully apparent as the description hereof proceeds, are attained by the novel construction, combination and arrangement of parts, hereinafter described, and illustrated in the accompanying drawing, forming a material component of this disclosure, and in which:

Figure 5 is a side elevational view similar to Figure 1, but showing the device in an operative position, the wire in this view having been stripped, the empty shell extending beyond the blades.

Figure 6 is a sectional top plan view of the gripping element of the device in a relaxed position.

Figure 7 is a view similar to Figure 6, but showing the gripping element in operative position; and Figure 8 is a view similar to Figure 7 but showing electrical wire in engagement with the gripping element, the latter being in operative or gripping position.

Figure 2:
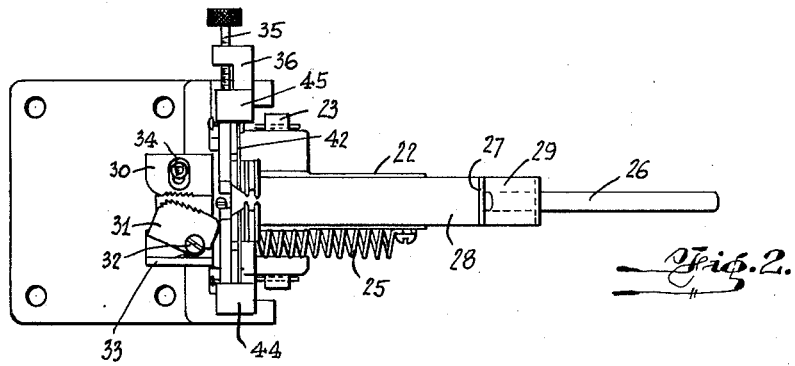
Figure 2 is a top plan view of the device illustrated in Figure 1.
Figure 1:
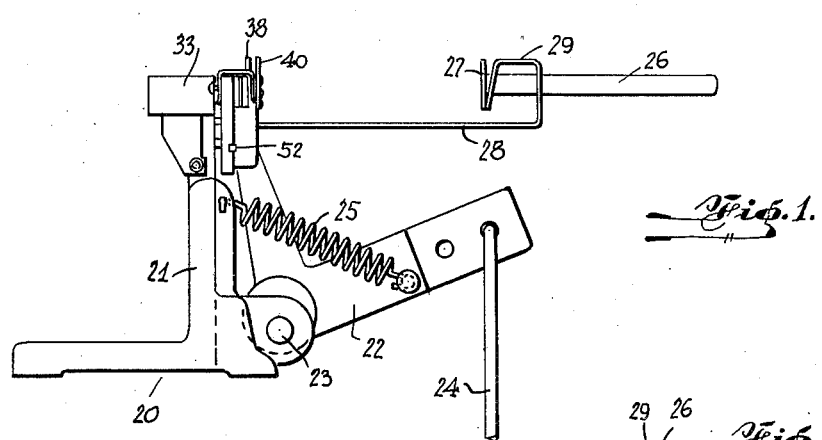
Figure 1 is a side elevational view of a wire stripping machine, constructed in accordance with the present invention.
Figure 3:
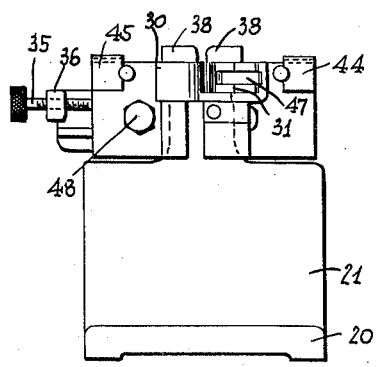
Figure 3 is a left hand end view of the machine shown in Figure 1.
Figure 4:
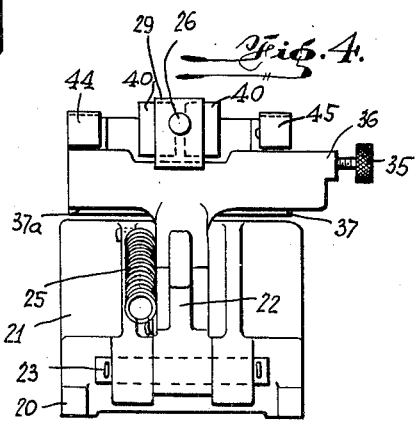
Figure 4 is an illustration similar to Figure 3, but showing the right hand end of the device.

Referring in greater detail to the drawing, the numeral 20 designates in general a base which may preferably be cast from steel or other desirable and suitable material, the base having integrally formed therewith an upright 21, at the juncture between the horizontal and vertical sections of the base, a bell crank lever 22 is fulcrumed, as at 23. A pedal connection 24 may be provided to extend from an opening near the outer end of lever 22, the connection being indicated by the numeral 24 and extending preferably to a spring pressed foot pedal or other operating means (not shown). The outstretched arm 22 of the bell crank lever is connected to upright 21 by a tension spring 25, one end of which may be secured to the upright and the other to the arm in any desirable manner. Action of spring 25 normally presses the lever against the said upright.

Seated upon the cross-head portion of bell crank lever 22, at the center thereof and extending rearwardly, as is illustrated in the several views of the drawings, is a support 28 terminating in an upturned clamp member 29 having an opening therein in which may freely move a wire length adjusting rod 26, rod 26 terminating at its other end in a head 27, the purpose of said rod to be more fully explained as the description hereof proceeds.

Seated near the upper edge of upright 21 and secured thereto by screws, pins, rivets or in any other suitable and desirable manner are a pair of spaced-apart supports 33 for a pair of gripping jaws 30 and 31, jaw 30 being stationary, and jaw 31, being fulcrumed as at 32, is adapted to swing slightly. The support for jaw 31 is provided with an upright wall section, as may be seen in several of the views, such as Figures 6, 7 and 8, the purpose of which it is to partly limit the swinging movement of jaw 31. Stationary jaw 30 may be provided with an adjusting screw 34, to adjust the relative distance between the jaws, so that wires of different diameters may be accommodated therebetween.

Secured to the crosshead of lever 22, and extending upwardly therebove, are a pair of spaced-apart plates 37 and 37a, secured to the said cross-head by bolts 48, the securing means for plate 37 permitting slight lateral displacement of the said plate to increase or decrease the distance between the plates. Towards that end, plate adjusting screw 35 is provided, which may enter through plate adjusting screw bracelet 36.

Secured to plates 37 and 37a, at the center thereof, and extending upwardly therebeyond are a pair of cutting elements 38 and 39, terminating at their rear in a pair of gripping members 40 and 41. The cutting elements 38 and 39 are spaced apart, their distance from each other being considerably less than the distance between plates 37 and 37a, so that the gap between the said plates is almost entirely filled by the cutting edges of the cutting elements.

The said cutting elements are mounted against plates 37 and 37a upon a pair of spring plates, respectively numbered 42 and 43.

Cutting elements 38 and 39 are removable, and other cutting elements may be substituted so that wire having coverings of different thicknesses may be stripped. To make such an interchange of cutting elements readily possible, the cutting elements are secured to plates 37 and 37a by clamps 44 and 45 respectively, for instant removal and exchange.

When the device is in operative position, the tip of jaw 31 is pressed against jaw 30 through the action of spring 46 one end of which is bent about fulcrum 32 and presses against the wall of support 33, and the body of said spring 46 rests in cut-out 47 in jaw 31, provided for that purpose.

For purposes of illustration, a portion of wire, such as might be stripped by this machine, is shown in several views of the drawing, and is referred to by the numeral 49. To further clarify the operation, a portion of stripped wire, 50, is shown in Figure 5, and a portion of hollow covering, after stripping, is shown at 51. A plate guide key 52 may be provided, so as to retain the plates in proper alinement at all times. At their inner faces, jaws 30 and 31 may be provided with a plurality of teeth, to effect firmness in gripping of wire held therebetween, the said teeth being referred to by the numerals 53 and 54. A pair of pins 56 are provided, normally pressing against the cutting elements 38 and 39, which tends to separate the cutting elements from each other when the device is in an inoperative position. Arrow A indicates the direction in which bell crank lever moves when wire is in the process of being stripped.

There has thus been shown a novel and highly effective wire stripping machine. The device itself may be mounted upon a table, work bench or other support, and for that purpose base 20 is provided with a plurality of openings, as shown in Figure 2, through which screws or other securing means may pass.

The device operates as follows: In its inoperative position, the several elements are best illustrated in Figure 6. Here it will be seen that, bell crank lever is firmly pressed against the upright 21, partly through the action of spring 25 and partly through the action of another spring (not shown) which controls a foot pedal or other operating means (also not shown). In that position, pins 56 pressing against spring plates 42 and 43, dispose the cutting elements angularly with relation to the plates 37 and 37a and the gripping jaws 30 and 31 are widely spaced apart. Guide rod 26 is moved forward or backward, depending upon the length of wire to be stripped. A piece of wire may now be entered between the open gripping jaws and the spaced apart cutting elements, to the length determined by the distance between head 27 and the cutting elements. When the device is now activated, either by stepping upon a foot pedal or in any other desirable manner, jaw 31 will swing towards jaw 30 and, through release of contact between pins 56 and the spring plates, the cutting elements will come together in the manner shown in Figures 7 and 8. The bell crank lever will move backwards in the direction of arrow A until the position shown in Figure 5 has been reached, whereupon, since the wire intended to be stripped, will have been stripped, pressure against the foot pedal, or activation of whatever source of power may be used, is stopped, and the device will snap back into the position indicated in Figure 6, ready for the next job. Since the covering on some types of wire is thicker than on other wire, or since the material of which the covering is made may differ, some being made of rubber, others of fabric etc., different kinds of cutting edges will be required to fill these needs. Hence the cutting elements may be removed by the removal of clamps 44 and 45, to be replaced by others in accordance with the particular need. Inasmuch also, as wires differ in thickness, plate 37 and jaw 30 are provided with means for lateral adjustment, so as to increase or decrease the distance between plates 37—37a and jaws 30—31.

Thus there is here presented a highly efficient machine for the stripping of electric wire. It is to be clearly understood that the device here presented is the best known embodiment thereof, but the present disclosure is to be regarded as descriptive and illustrative only of this embodiment, and not as restrictive or limitative to the exact details shown; applicant reserving the right to make such changes in the construction of his device as may come within the scope of the appended claims without thereby departing either from the scope or the spirit of the present invention.

Having thus described the invention, what is claimed as new and desired to secure by Letters Patent, is:

1. A wire stripping machine comprising a foot member, an upright integrally formed therewith, a bell crank pivotally secured to said foot member, means secured at one end to said upright and at its other end to said bell crank normally urging said bell crank against said upright, a head on said upright, a pair of spaced-apart supports on said head, a pair of gripping elements, one of said gripping elements rigidly mounted on one of said supports, the other of said gripping elements fulcrumed to the second of said supports, means formed integrally with the second of said supports limiting the swinging movement of the gripping element fulcrumed to it, a pair of spaced-apart plates at the upper end of said bell crank, one of said plates being rigidly mounted, the other of said plates adapted to be manually moved on a horizontal plane toward or away from said first named plate, a pair of cutting elements, each of said cutting elements secured on a resilient support to one of said plates, and slidable means projecting from said plates and engaging said supports on the head when the bell crank is moved toward the upright to urge said cutting elements apart, said urging means being movable away from said cutting elements and toward the supports on the head when the bell crank is moved away from said upright.

2. A wire stripping machine comprising a base, an upright formed integrally therewith, a bell crank lever pivotally mounted to said base, said bell crank lever having a head, means extending rearwardly from said head for adjustably indicating the length of wire to be stripped, a pair of supports mounted on said upright, a jaw member on each support, a pair of plates and a pair of cutting members on the head of said bell crank lever, each of said cutting elements mounted on a resilient support which is secured to one of said plates, said jaw members and said cutting elements being spaced apart, means projecting from and slidably retained in said plates and engaging said jaw supports when the bell crank lever is moved toward the upright to urge said cutting elements apart, said urging means being disengaged from said supports when the bell crank lever is moved away from said upright.

3. A wire stripping machine comprising a base, an upright integrally formed therewith, a bell crank lever pivotally mounted to said upright, said bell crank lever having a head, a wire guide member extending therefrom, a pair of spaced-apart plates on said head, a pair of cutting elements, each of said cutting elements resiliently secured to one of said plates, one of said plates rigidly held on said head, the other of said plates adapted to be manually moved on a horizontal plane to increase or decrease the space between the plates, a pair of gripping jaws, a pair of spaced-apart supports on said upright on which said gripping jaws are mounted, and means slidably secured in said head and engaging said cutting elements and said jaws to urge said elements apart when the bell crank lever is moved toward the upright, said urging means being disengaged from said upright when the bell crank lever is moved away from said upright.

NATHAN RODNEY SCHWARTZ.

REFERENCES CITED

The following references are of record in the file of this patent:

UNITED STATES PATENTS

| Number | Name | Date |
| --- | --- | --- |
| 1,618,734 | Smitak | Feb. 22, 1927 |
| 1,902,742 | Wentink | Mar. 21, 1933 |
| 1,998,391 | Shaw | Apr. 16, 1935 |
| 2,179,581 | Voogd | Nov. 14, 1939 |
| 2,285,167 | Montgomery | June 2, 1942 |
| 2,313,793 | Wood | Mar. 16, 1943 |